(12) United States Patent
Harrison et al.

(10) Patent No.: US 11,747,438 B1
(45) Date of Patent: Sep. 5, 2023

(54) COGNITIVE ELECTRONIC WARFARE SCHEDULER

(71) Applicant: BAE Systems Information and Electronic Systems Integration Inc., Nashua, NH (US)

(72) Inventors: Daniel B. Harrison, Litchfield, NH (US); Stuart M. Lopata, Little Falls, NJ (US); Charles R. Skarda, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 357 days.

(21) Appl. No.: 17/143,691

(22) Filed: Jan. 7, 2021

(51) Int. Cl.
*G01S 7/36* (2006.01)
(52) U.S. Cl.
CPC ........................................ *G01S 7/36* (2013.01)
(58) Field of Classification Search
CPC ........................................ G01S 7/36; G01S 7/40
See application file for complete search history.

(56) References Cited

U.S. PATENT DOCUMENTS

| | | | | |
|---|---|---|---|---|
| 5,250,951 A * | 10/1993 | Valentine | ................... | G01S 7/04 340/506 |
| 6,873,284 B2 * | 3/2005 | Gounalis | ................. | G01S 7/021 342/13 |
| 7,038,611 B2 * | 5/2006 | Gounalis | ................. | G01S 7/021 342/13 |
| 7,808,421 B2 * | 10/2010 | Kunz | ...................... | G06F 9/541 342/422 |
| 8,812,229 B2 * | 8/2014 | Rosswog | ............. | G08G 5/0039 342/63 |
| 8,886,038 B1 * | 11/2014 | Chabinsky | ............... | H04K 3/42 342/13 |
| 10,170,840 B2 * | 1/2019 | Henry | ..................... | H01Q 13/06 |
| 10,365,348 B2 * | 7/2019 | Markel | ................... | G01S 7/021 |
| 10,407,025 B2 * | 9/2019 | Kim | ....................... | B60R 25/24 |
| 11,269,046 B2 * | 3/2022 | Marshall | .................. | G01S 5/06 |
| 2004/0030463 A1 * | 2/2004 | Stockdale | ............ | G05D 1/0202 701/3 |
| 2008/0106458 A1 * | 5/2008 | Honda | ..................... | G01S 7/023 342/59 |
| 2009/0326735 A1 * | 12/2009 | Wood | .................. | H04B 7/18506 701/2 |
| 2012/0256793 A1 * | 10/2012 | Hoover | ...................... | G01S 3/48 342/428 |
| 2018/0313880 A1 * | 11/2018 | Logan | ................... | G01R 23/155 |
| 2019/0315373 A1 * | 10/2019 | Kondo | ............... | B60W 30/095 |
| 2020/0166607 A1 | 5/2020 | Jolly et al. | | |
| 2020/0386890 A1 * | 12/2020 | Oggier | .................. | G01S 7/4876 |
| 2022/0141830 A1 * | 5/2022 | Furuichi | ........... | H04W 72/0453 370/329 |

* cited by examiner

*Primary Examiner* — Timothy A Brainard
*Assistant Examiner* — Kenneth W Good
(74) *Attorney, Agent, or Firm* — Sand, Sebolt & Wernow LPA; Gary McFaline (57) ABSTRACT

A cognitive scheduler and asset allocation system to optimize electronic warfare (EW) resource allocation in reaction to RF signals observed in real-time without the need for prior collected data and without a predetermined scan schedule. The EW system of the present disclosure may further provide optimum resource allocation to minimize response time and to more effectively react to agile threat systems in an area of operations.

17 Claims, 7 Drawing Sheets

COGNITIVE ELECTRONIC WARFARE SCHEDULER

TECHNICAL FIELD

The present disclosure relates generally to the field of electronic warfare sensors and receivers. More particularly, in one example, the present disclosure relates to a cognitive electronic warfare scheduling system for allocating electronic warfare sensors and/or receivers. Specifically, in another example, the present disclosure relates to cognitive electronic warfare scheduler and process for allocating receiver assets dynamically in real-time in response to detected signals.

BACKGROUND

Electronic warfare (EW) is one of many facets of modern military operations. Specifically, EW is the observation and use of the electromagnetic spectrum, including actions to detect, evade, attack, or impede enemy vehicles or installations that likewise broadcast or operate within the electromagnetic spectrum. The general purpose of EW is to utilize the electromagnetic spectrum to obtain an advantage for operations in neutral or contested environments. EW may be applied from multiple platforms ranging across all frequencies of the electromagnetic spectrum and may be utilized in air, sea, land, and/or space operations by both manned and unmanned systems.

One of the most common military uses of EW is through the use, operation, and manipulation of radar signals. Radar signals may be actively used to locate and track a target or to guide munitions to a target. Radar may also be passively used to locate and track by "listening" or monitoring for emitted signals originating from enemy sources. Further, stealth technologies, jamming emissions, and other defensive measures may be employed to thwart the use of radar in such location, tracking, and/or targeting efforts. Radar utilizes radio waves to determine the range, angle and/or velocity of objects by producing electromagnetic waves and measuring the reflection and return of those waves as they bounce off an object and return to a receiver. Thus, modern military applications of radar tend to include threat detection, threat avoidance, as well as threat engagement and tracking of enemy movements.

EW also includes the use of the electromagnetic spectrum to locate enemy positions through the active monitoring and detecting of emitters and the electromagnetic signals produced therefrom. While this includes radar and radio waves, it may also include other bands of the electromagnetic spectrum, including visible light and infrared light.

As it further relates to military operations, EW is an important aspect of both offensive and defensive operations in that these technologies tend to integrate radar warning systems with geolocation and direction finding processes, situational awareness, and/or self-protection (countermeasure) systems. Further, EW is utilized to detect and defeat advanced threats in operational environments, including environments that are highly contested with dense signal activity. EW systems may further enable deeper penetration and protection against modern integrated defenses.

As military technology advances, particularly those technologies related to EW systems, new emitters have come online that are capable of operation in multiple frequencies of the electromagnetic spectrum and across multiple channels. These advanced emitters are capable of both broadcasting and receiving in short, non-continuous bursts, and are considered to be very agile systems that may both move in physical location as well as jump through frequency and dynamic ranges to evade detection while maintaining effective detection capabilities of their own. Thus, most modern emitters now have a low probability of intercept (LPI) forcing EW systems to adapt to account for the agility and complexity of these modern threats.

Current EW systems typically react to advanced threats through employment of scan schedules, which utilize previously collected data to generate a picture of an area of operations and the emitters contained therein prior to entering or otherwise operating in that area. Typically, this involves data gathering and collections through pre-mission scanning for emitter signals and other electromagnetic radiation originating from the region. This data may be collected remotely through use of distant radar installations or reconnaissance vehicles such as reconnaissance aircraft, or may be a hybrid of information gathered from these sources along with data from prior operations in that area, including, but not limited to, satellite, aerial, and/or ground surveillance data, and/or information gathered through other means. This may occur over an extended period of time and may then be used to generate mission plans, including a scan schedule for EW assets. Specifically, this pre-mission information is typically utilized to generate a schedule of EW asset allocations in that it may predetermine and direct specific assets, such as receiver assets, to monitor various frequency ranges, directions, and/or locations within the area of operations on a predetermined schedule or at predetermined intervals. These predetermined scan schedules then dictate how an EW system searches the electromagnetic spectrum during a mission; however, as mentioned above, modern emitters are more agile and may not align with a predetermined scan schedule and may then evade detection during a mission.

Accordingly, some current systems employ adaptive measures to adjust the scan schedule in real-time; however, even these system still tend to require the pre-mission information gathering, mission planning, and predetermined scan schedule as a basis for those adaptive solutions.

SUMMARY

The present disclosure addresses these and other issues by providing a cognitive scheduler and asset allocation system to optimize electronic warfare (EW) resource allocation in reaction to RF signals observed in real-time without the need for prior collected data and without a predetermined scan schedule. The EW system of the present disclosure may further provide optimum resource allocation to minimize response time and to more effectively react to agile threat systems in an area of operations.

In one aspect, an exemplary embodiment of the present disclosure may provide a method comprising: operating a platform carrying at least one wideband receiver and at least two additional receivers thereon in a theater containing one or more active emitters; detecting electromagnetic (EM) signals originating from the one or more active emitters with the at least one wideband receiver; assigning a priority level to each frequency band of a plurality of frequency bands encompassing the detected EM signals from the at least one or more active emitters; allocating a first receiver of the at least two additional receivers to a first frequency band having the highest priority level of the plurality of frequency bands, the first frequency band encompassing a first detected EM signal; and allocating a second receiver of the at least two additional receivers to a second frequency band having the second highest priority level of the plurality of frequency bands, the second frequency band encompassing a second detected EM signal. This exemplary embodiment or another exemplary embodiment may further provide continuously increasing the priority level of each frequency band of the plurality of frequency bands that does not have a receiver of the at least two additional receivers allocated thereto. This exemplary embodiment or another exemplary embodiment may further provide reallocating at least one of the at least two additional receivers to a third frequency band of the plurality of frequency bands when the third frequency band increases to a priority level higher than the priority level of one of the first and second frequency bands. This exemplary embodiment or another exemplary embodiment may further provide continuously reallocating the at least two additional receivers to other frequency bands of the plurality of frequency bands as the priority levels increase over time. This exemplary embodiment or another exemplary embodiment may further provide wherein each step is performed continuously and in near real-time. This exemplary embodiment or another exemplary embodiment may further provide wherein detecting EM signals, assigning priority levels, and allocating the at least two additional receivers are performed without a predetermined scan schedule. This exemplary embodiment or another exemplary embodiment may further provide wherein assigning the priority level further comprises: determining a threat level of each active emitter in the theater; and assigning a relative priority to the plurality of frequency bands according to the threat level of the emitters generating EM signals in each band of the plurality of frequency bands. This exemplary embodiment or another exemplary embodiment may further provide detecting an EM signal originating from a newly active emitter in the theater with the at least one wideband receiver; assigning a priority level to the frequency band of a plurality of frequency bands encompassing the EM signal from the newly active emitter; and reallocating one of the first and second receivers of the at least two additional receivers to a frequency band encompassing the EM signal from the newly active emitter only if the priority level thereof exceeds the priority level of one of the first and second frequency bands. This exemplary embodiment or another exemplary embodiment may further provide continuously increasing the priority level of each frequency band of the plurality of frequency bands that does not have a receiver of the at least two additional receivers allocated thereto; and continuously reallocating the at least two additional receivers to other frequency bands of the plurality of frequency bands as the priority levels increase over time. This exemplary embodiment or another exemplary embodiment may further provide wherein assigning the priority level further comprises: determining a threat level of each active emitter in the theater; and assigning a relative priority to the plurality of frequency bands according to the threat level of the emitters generating EM signals in each band of the plurality of frequency bands. This exemplary embodiment or another exemplary embodiment may further provide wherein the platform is an aircraft.

In another aspect, an exemplary embodiment of the present disclosure may provide a method comprising: operating a platform carrying at least one receiver thereon in a theater containing at least one active emitter; detecting an electromagnetic (EM) signal originating from the at least one active emitter with the at least one receiver; assigning a priority level to a first frequency band of a plurality of frequency bands encompassing the detected EM signal from the at least one active emitter; allocating the at least one receiver to the first frequency band; continuously increasing the priority level of each frequency band of the plurality of frequency bands that does not have a receiver of the at least one receiver allocated thereto; and continuously reallocating the at least one receiver to other frequency bands of the plurality of frequency bands as the priority levels increase over time. This exemplary embodiment or another exemplary embodiment may further provide wherein the at least one active emitter further comprises a plurality of active emitters and the at least one receiver further comprises a plurality of receivers. This exemplary embodiment or another exemplary embodiment may further provide further comprising: detecting a first EM signal originating from a first emitter of the plurality of active emitters; detecting a second EM signal originating from a second emitter of the plurality of active emitters; assigning a priority level to a first frequency band of the plurality of frequency bands encompassing the first EM signal and a second frequency band of the plurality of frequency bands encompassing the second EM signal; allocating a first receiver of the plurality of receivers to the one of the first and second frequency bands having the higher priority level; and allocating a second receiver of the plurality of receivers to the other of the first and second frequency bands having the lower priority level. This exemplary embodiment or another exemplary embodiment may further provide detecting an EM signal originating from a newly active emitter in the theater; assigning a priority level to the EM signal from the newly active emitter; and reallocating the at least one receiver to a second frequency band of the plurality of frequency bands encompassing the EM signal from the newly active emitter only if the priority level thereof exceeds the priority level of the first frequency band. This exemplary embodiment or another exemplary embodiment may further provide wherein detecting EM signals, assigning priority levels, and allocating the at least two additional receivers are performed without a predetermined scan schedule. This exemplary embodiment or another exemplary embodiment may further provide wherein assigning the priority level further comprises: determining a threat level of each active emitter in the theater; and assigning a relative priority to the plurality of frequency bands according to the threat level of the emitters generating EM signals in each band of the plurality of frequency bands. This exemplary embodiment or another exemplary embodiment may further provide wherein each step is performed continuously and in near real-time. This exemplary embodiment or another exemplary embodiment may further provide wherein the platform is an aircraft.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 6.

Similar numbers refer to similar parts throughout the drawings.

DETAILED DESCRIPTION

Electronic warfare (EW) systems may be and are commonly used with many different platforms (referenced herein as platform 20, discussed below), including manned and unmanned aircraft, vehicles, ships, and/or land-based installations. Generally speaking and with general reference to FIGS. 1A-1C, a cognitive EW system of the present disclosure is shown and generally referenced as EW system 10. EW system 10 may be understood to be cognitive in that EW system 10 may dynamically adjust or allocate receiver 16 assets in real-time and without directed input from an operator or from other systems, as discussed further herein.

EW system 10 may include one or more processors 12, one or more wideband receivers 14, and one or more receivers 16 which may include one or more antennas 18 therewith. These EW system 10 components, namely, processor 12, wideband receivers 14, and/or receivers 16, including any antennas 18 thereof, may generally be referred to as assets. Therefore, it will be understood that the term assets as used herein may refer to any or all of these components collectively unless specifically stated otherwise.

Processor 12 may be one or more processors which may further be a computer, processor, logic, or series of logics including or in communication with at least one non-transitory storage medium. According to one aspect, processor 12 may be a digital processor or processors capable of carrying out and executing a set of instructions or processes encoded thereon, as further discussed herein. According to one aspect, processor 12 may be operationally connected to other assets. According to another aspect, processor 12 may be remote from other EW assets and may be in wired or wireless communication therewith. The connectivity and communication between other EW assets and the processor 12 may therefore vary depending upon the desired implementation and installation parameters of EW system 10, as discussed herein. Processor 12 may further be or include a cognitive scheduler that may control the allocation of EW system 10 assets, as discussed below.

Wideband receiver 14 may be one or more wideband receivers 14 operable to detect electromagnetic signals as radio frequency (RF) signals, or the like, over a wide frequency range covering the electromagnetic spectrum and/or a portion thereof as used in EW applications. According to one aspect, wideband receiver 14 may be operable to detect RF signals from any frequency range or sub-range of the electromagnetic spectrum, as desired for the specific EW application and implementation. According to another aspect, wideband receiver 14 may be operable to detect RF signals in a larger range than the specifically desired RF spectrum range; however, the actual operation thereof may be limited according to the desired implementation. Wideband receiver 14 may be any suitable wideband receiver provided it covers the range of interest of the RF spectrum and may include commercially available wideband receivers or the equivalent thereto. According to one aspect, wideband receiver 14 may be an ultra-wideband receiver or receivers. Wideband receiver 14 may be in communication with processor 12 through any standard connection, including wired or wireless connections thereto.

Receivers 16 may generally be any standard receiver operable to receive an RF signal and in further communication with processor 12. Receivers 16 may differ from wideband receiver 14 in that while wideband receiver 14 is operable to detect or receive an RF signal across a large spectral range, receivers 16 are understood to be directed and/or directable in the sense that they may provide additional measurement capabilities than wideband receiver 14. For example, receivers 16 may have a larger dynamic range and/or a greater sensitivity than wideband receiver 14. Put another way, receivers 16 are understood to be more narrowly focused and/or focusable than wideband receiver 14.

Accordingly, receivers 16 may include one or more receiving antennas 18, which may be optionally arranged in one or more antenna 18 arrays, as discussed herein. Antennas 18 may be monopole, dipole, and/or directional antennas, or any combination thereof, or may be any other suitable RF antenna as dictated by the desired implementation and/or the chosen platform 20. Antennas 18 may be arranged in any desired configuration appropriate for the installation conditions. According to one aspect, each of these antennas 18 may be an antenna array having multiple antenna elements or antennas 18 contained therein. Receiving antennas 18 may therefore be any antenna or antenna array capable of detecting and receiving signals originating from signal generators (emitters) remote from EW system 10. According to one aspect, antennas 18 may be optimized to detect and receive signals having one or more polarizations across varying frequency bands and/or having varying dynamic range. According to another aspect, different antennas 18 may be included and optimized and/or calibrated to detect and receive signals of differing polarization and/or of different frequencies or ranges of frequencies.

Receiver 16 and antennas 18 may be in communication with processor 12 through a wired or wireless connection, as dictated by the desired implementation. Similarly, receiver 16 and antennas 18 may further be in communication with other EW system 10 assets, such as wideband receiver 14 through wired or wireless connections, as desired.

According to one aspect, it may be desirable, but not required, to have multiple receivers 16 and/or receiving antennas 18 spaced apart from one another on a platform 20 to facilitate the determination of characteristics of an incoming signal that is detected by antennas 18. Having receivers 16 and/or antennas 18 spaced apart may allow discrimination of characteristics within an incoming RF signal that may be indicative of the source direction and/or geolocation of, and may provide additional information about, the emitter producing the incoming signal. Therefore, it is understood that these antennas 18 may be placed at positions across a platform 20 as dictated by the type of platform and/or the implementation parameters. Some non-limiting examples of multiple receiver 16 and antenna 18 positions and configurations are provided in FIGS. 1A-1C, and are discussed further below.

Depending on the desired implementation and use, EW system 10 may include additional assets, such as one or more countermeasures including flares, chaff, and/or jamming technologies. According to another aspect, EW system 10 may further include additional assets operable to further detect, analyze, process, and/or transform any incoming and received RF signals. For example, EW system 10 may include one or more frequency converters operable to convert the alternating current of one frequency to the alternating current of another frequency and may include circuits converting RF signals to different frequencies from the input. According to another aspect, EW system 10 may include additional onboard or remotely operated assets to further communicate RF signal data and/or results of any analysis of RF signal data to other systems, units, and/or platforms, as dictated by the desired implementation.

Figure 1A:
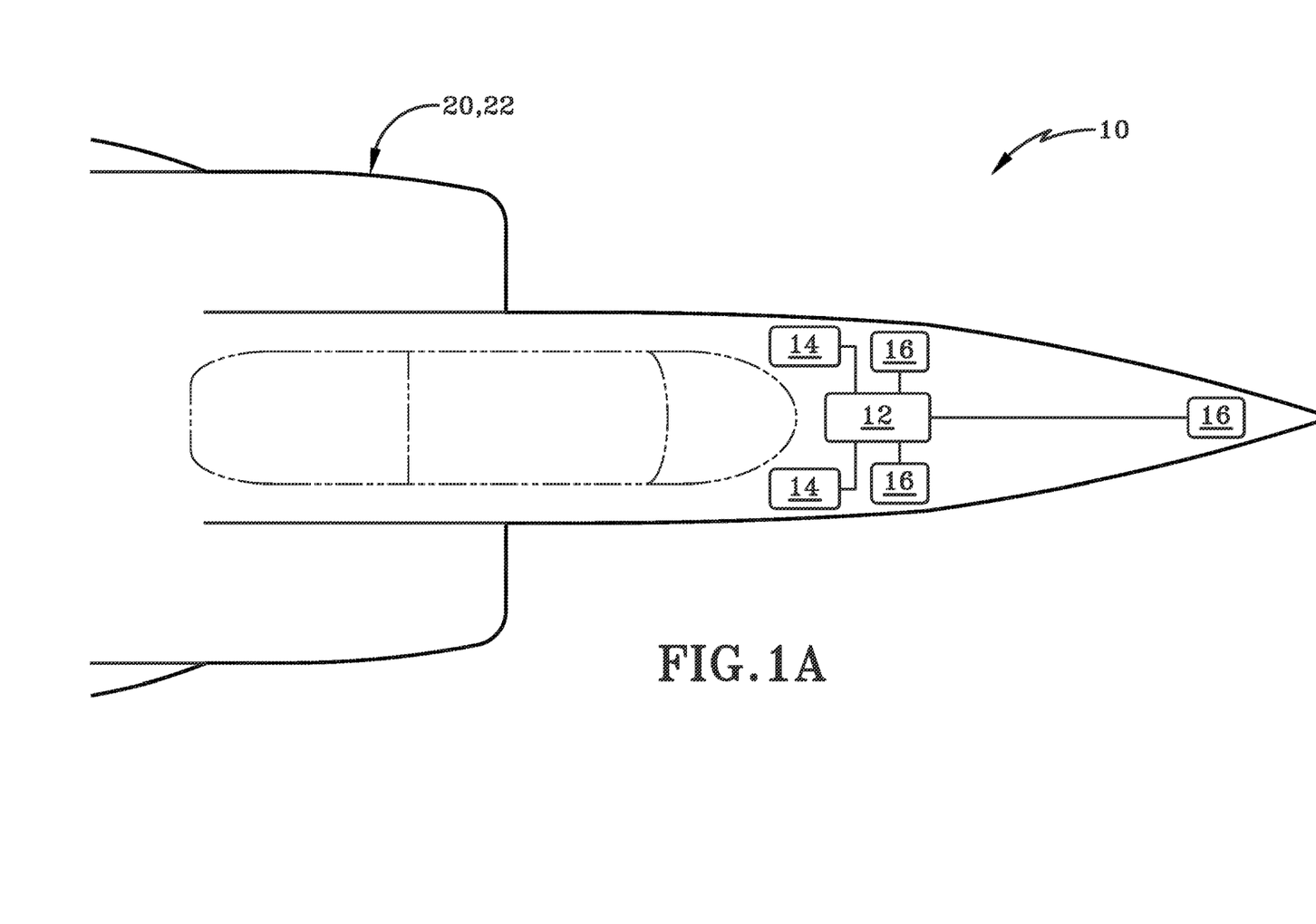
FIG. 1A (FIG. 1A) is a schematic overhead view of an exemplary platform employing a cognitive electronic warfare system according to one aspect of the present disclosure.
Figure 1B:
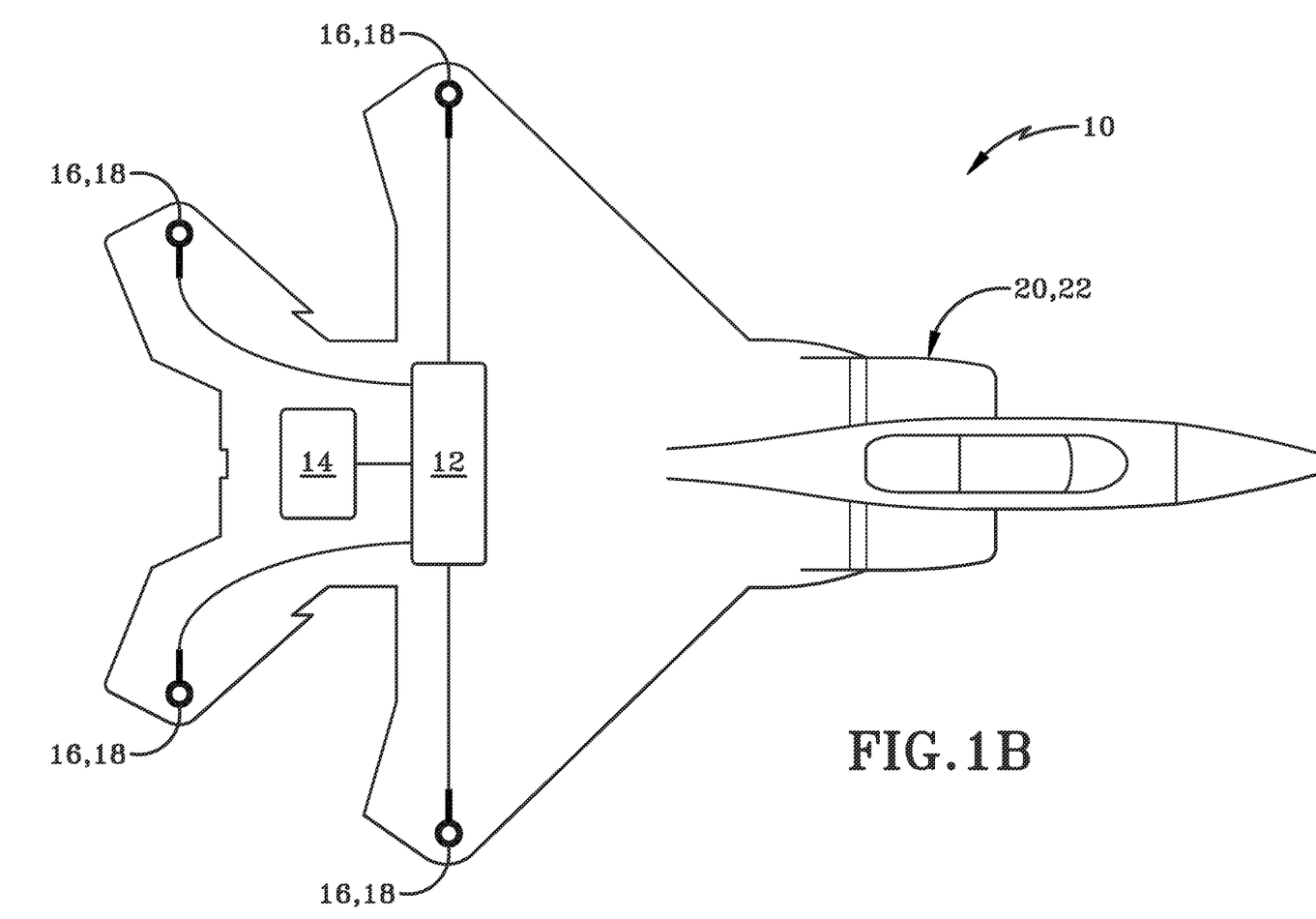
FIG. 1B (FIG. 1B) is a schematic overhead view of an exemplary platform employing a cognitive electronic warfare system having a quadrant receiver array system according to one aspect of the present disclosure.
Figure 1C:
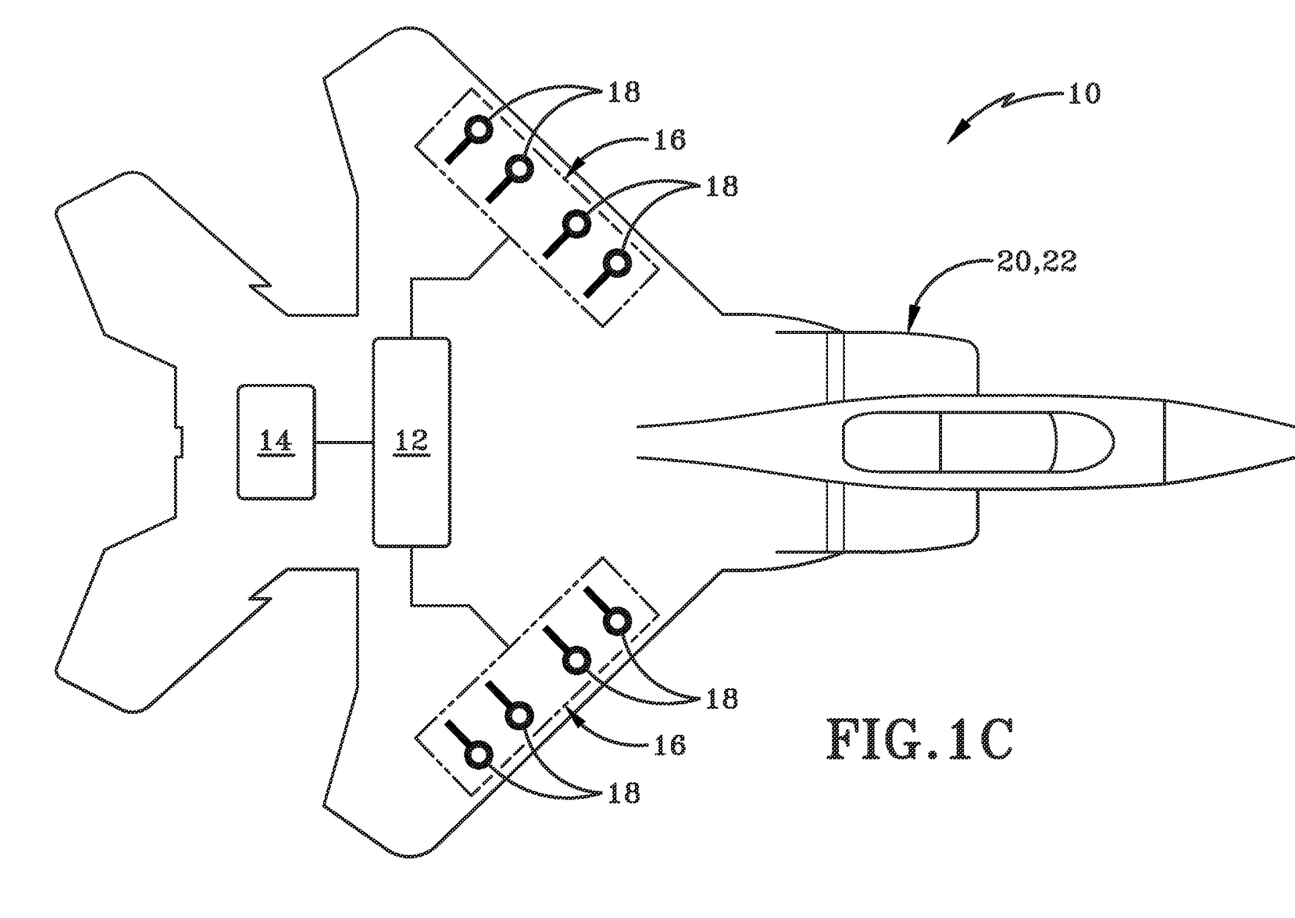
FIG. 1C (FIG. 1C) is a schematic overhead view of an exemplary platform employing a cognitive electronic warfare system having a dual orthogonal liner receiver array system according to one aspect of the present disclosure.

EW system 10 may be carried on a platform 20, such as within the body or fuselage or an aircraft 22 as shown in FIGS. 1A-1C. EW system 10 may have any desired arrangement or configuration on platform 20 provided that any desired or necessary connections and/or communications between the components thereof are maintained.

Platform 20 may be any platform capable of performing EW operations and may include but are not limited to, land-based installations, vehicles, ships, space-borne vehicles, and/or any unmanned or remotely operated versions thereof. Platform 20 may further be or include manned or unmanned aircraft, such as the exemplary platform 20 shown in the figures as a manned aircraft 22. Therefore, for the purpose of simplicity and clarity, platform 20 will be referred to for the remainder of this disclosure as an aircraft 22; however, it will be understood that other platforms 20 may be readily adapted for use with EW system 10. It will likewise be understood that the systems and methods described herein may be adapted for use with multiple different platforms and/or for use with multiple platforms operating cohesively, such as in a unit or a swarm, or the like.

The configuration and placement of EW system 10 assets on a platform 20 is considered to be the architecture of the EW system 10. This architecture may be specifically and carefully planned to meet the needs of any particular EW system 10 and may be changed and/or upgraded, as needed; however, the particular architecture may vary depending on the desired implementation. For example, with reference to FIG. 1A, an EW system 10 is shown in a generalized configuration to illustrate one general example of how an EW system 10 may be carried within an aircraft 22. It will be understood, however, that each individual asset may be placed and/or located at any position within or on platform 20. With reference to FIG. 1B, another example wherein platform 20 is an aircraft 22, it is shown with receivers 16 being individual receiving antennas 18 arranged in a quadrant pattern on the wings and tail of the aircraft 22. With reference to FIG. 1C, a third example is shown wherein receivers 16 are arranged on the leading edge of the wings of an aircraft 22 and are configured as dual orthogonal linear arrays having multiple antennas 18 therein. These examples are intended to be representative examples and should be understood to be non-limiting examples of general configurations and/or architecture for a platform 20 carrying an EW system 10 of the present disclosure. It will be further understood that the number, size, and/or type of assets employed may likewise vary depending on the specific platform 20 being utilized and may be limited by the available space thereon, as well as by the load capacity of any individual platform 20. According to another aspect, assets may be moved or movable between multiple positions depending upon the desired use for a specific mission or operation, or as dictated by the particulars of the platform 20 being used.

The processes and systems described herein, such as EW system 10, may be readily adapted for use with legacy systems; i.e., existing architecture, without a need to change or upgrade such systems. Specifically, EW system 10 may be adapted for installation and integration into existing systems and may allow for use thereof with little to no modification to the architecture of legacy systems. According to another aspect, legacy systems that are not equipped with the required assets may be modified to the extent necessary to include additional assets, as needed. For example, where a platform 20 utilizing a legacy system that does not have a wideband receiver 14 included therein, a wideband receiver 14 may be added and installed while utilizing the remaining legacy assets of the legacy system.

As used herein, an area of operations may be referred to as the theater of operations, or simply as theater 30, and may be considered a congested environment, which is contemplated to be an environment with a high utilization of the electromagnetic spectrum and may include hostile areas with enemy units present, civilian areas, or neutral areas that are not considered to include a threat. As mentioned above, all environments may be included within a single theater 30; however, not all environments are required to be present.

An enemy or enemy unit, as used herein, is contemplated to be any member or unit of an opposing force operating in the same environment, including, but not limited to persons, vehicles, stationary installations, satellites, or the like.

Having thus described the general configuration and components of EW system 10, the operation and method of use thereof will now be discussed.

As mentioned herein, current EW systems generally rely on a mission data file (MDF) and scan schedule to dictate the operation of the receivers utilized therein. Specifically, according to one aspect, current systems generate the MDF and scan schedule based on prior collected data relating to the emitters and/or RF spectrum environment in a theater 30. Accordingly, the information gathered regarding theater 30 and the emitters present therein typically occurs hours, days, and/or weeks in advance of missions into the theater 30, and prior to generating an MDF and scan schedule, which are generated before initiating a mission into the theater 30. Once the mission into the theater 30 is initiated, the predetermined scan schedule typically dictates the usage of receivers and other EW assets in a current EW system such that the scan schedule determines which receivers will be tuned to a particular frequency band and for how long each receiver will dwell in that band before switching or being redeployed to a different band. In current systems, these scan schedules are looking/listening for emitters that are expected to be present based on the prior data collected. Therefore current EW systems are inefficient as they may be spending time directing receivers to look for emitters that are no longer present and/or no longer actively emitting a signal. Additionally, predetermined scan schedules do not provide or otherwise allocate receiver assets to newly active emitters that were not present or active at the time the scan schedule was produced.

Previous attempts to address these include active monitoring and dynamic adjustment to the MDF and scan schedule based on RF signals detected while operating in the theater 30; however, these solutions still require the data gathering and pre-mission generation of an MDF and scan schedule, which may then be amended during operations within theater 30. Even then, these prior EW systems are still inefficient as they may initially direct receiver assets to an expected emitter and may only adjust the scan schedule once it discovers that that emitter is no longer present and/or is not in current operation. Further, these prior EW systems may take longer to detect, identify, and assign a priority to emitters that come online during the course of a mission in theater 30.

Contrast this with the EW system 10 of the present disclosure, which may utilize pre-mission data, if available, but does not require a scan schedule or MDF to detect and react to emitters within a theater 30. Specifically, according to one aspect, EW system 10 may be optimized to detect when an emitter is on and detectable; i.e. generating or emitting a detectable RF signal, and may then assign one or more receivers 16 to further monitor and collect data from that detected RF signal, or in that same frequency band. Thus, the EW system 10 of the present disclosure may allocate receiver 16 assets based on measurements of the current RF environment rather than by utilizing a predefined scan schedule and/or MDF. This reactive resource allocation may be enabled by the inclusion of wideband receiver 14, which provides pulse detections and measurements from across the full RF band covering the desired field of view. Prior systems did not have the benefit of a full-band receiver, and thus would realize a reduced benefit from a cognitive scheduler algorithm. Alternatively, according to another aspect and as discussed further below, the EW system 10 of the present disclosure may actively allocate receiver 16 assets in response to the RF environment using a cognitive scheduler algorithm without the use of a wideband receiver 14.

According to one aspect, EW system 10 may utilize an algorithm using "full-band" RF pulses received by wideband receiver 14 to assess relative priority of frequency ranges, as well using as knowledge of currently tracked emitters and a-priori programmed emitters (i.e. emitters which are expected, but not yet seen). The priority assessment may include a set of physics and radar processing based algorithms to evaluate priority on a pulse by pulse basis. Each assessment algorithm may be a single priority based criteria, which collectively combine in the cognitive scheduler algorithm to create a system-wide priority over frequency histogram (as seen in representative examples shown in FIGS. 2-4, discussed below). That system wide priority over frequency curve may then be used to allocate all receiver 16 assets to the highest priority frequency range in near real-time.

The cognitive scheduler algorithm inputs include full band pulse measurements from the wideband receiver 14. This includes all pulses across the frequency range that exceeds the full wideband receiver 14 detection level, and at a minimum includes all main beam pulses incident on the platform 20. These pulse measurements may then be used in the cognitive scheduler algorithm to evaluate the relative priority of each frequency range. Pulses may be assessed by a series of criteria, which each may evaluate the relative priority from a different perspective, collectively resulting in a near real-time assessment of the relative priority of the current RF environment as a function of frequency.

A second input is the current track data which may include both a-priori emitter data, and existing track data. In other words, both emitters which have been seen previously, and emitters which are programmed, but not yet seen may be included in this data set. For each track, the cognitive scheduler algorithm may extract a frequency range and priority to be merged with the near real-time assessed priority from the full-band received RF pulses.

A third input to the cognitive scheduler algorithm may be referred to as assessed priority filters, which may be a feedback loop from the EW system 10 to the cognitive scheduler of processor 12, to allow real time control of the EW system 10 behavior. These filters may allow the EW system 10 to specify to the scheduler that received pulses matching specific criteria are to be assigned a specific priority, regardless of the normal processing assessment. These filters essentially by-pass the calculation of a near real-time priority and substitute instead a priority specified by the EW system 10. This mechanism is used to prevent "thrashing" between the near real-time single pulse priority assessment in the scheduler, and the longer term emitter assessment algorithms in the EW system 10. Without this provision, one can anticipate a condition in which full-band pulses are assessed to be high priority resulting in a receiver 16 asset allocation. Once the receiver 16 assets collect and assess the waveforms from one or more emitters in that frequency range, the receiver 16 assets may assess these emitters as low priority. The assessed priority filters allow the receiver 16 assets to communicate back to the scheduler that pulses matching specific conditions should be assessed low and not high priority per normal scheduler processing.

These input criteria to the cognitive schedule algorithm may vary according to the specific goals and/or outcome of a particular operation. For example, a mission into a theater 30 for the purposes of surveillance may have a different desired outcome than an offensive mission. Accordingly, any of these inputs may be modified, increased, decreased, or omitted as desired for the particular use and further as dictated by the capabilities and/or operational requirements of any particular platform. It will therefore be understood that the above-referenced input criteria are provided as exemplary input criteria and not as limiting examples thereof.

Accordingly, EW system 10 may detect the presence of an emitted signal and may determine the priority of the frequency band in which the signal lies. This initial detection and priority assignment may be accomplished using wideband receiver 14 to detect full band pulse measurements which allow for a near real-time priority assessment. EW system 10 may then further extract tracked data from previously detected emitters and from expected, but not yet detected, emitters and may merge this data with the real-time assessments. Finally EW system 10 may gather information from active emitters using receivers 16 to further refine priority assessment through the analysis of data collected while receiver 16 assets are allocated to the specific frequency bands.

In essence, the cognitive scheduler of processor 12 and the cognitive scheduler algorithm may generally allow wideband receiver 14 to act as a queuing receiver, which may give a quick priority detection based on the fact that an emitter is active while receiver 16 assets are then allocated to that signal's frequency band may further narrow that priority by determining the type and threat level of the emitter generating that detected signal.

Again, as EW system 10 is reactive to the RF environment, no predictive activity or prior scan schedule is required. Instead, a-priori data may be utilized and merged with active real-time assessment of the RF environment when available. By comparison, in instances where receiver 16 assets are tuned to a particular frequency band for the same amount of time as in current EW systems using a predetermined scan schedule, up to a 400% or more increase in pulses detected was observed utilizing EW system 10 over these prior EW systems.

Figure 2:
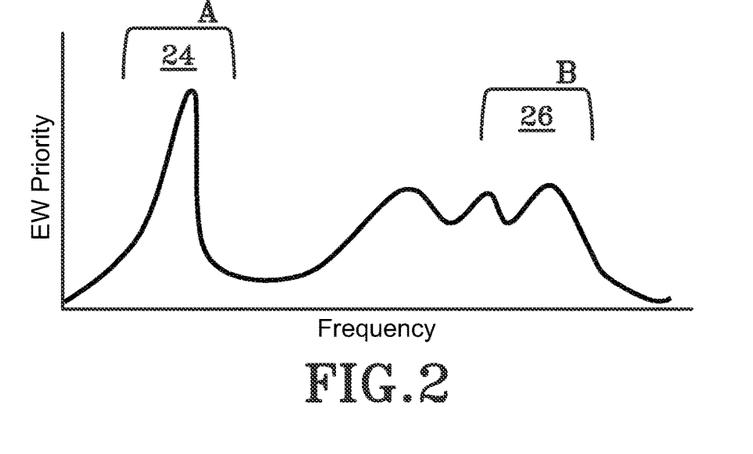
FIG. 2 (FIG. 2) is an exemplary histogram of an electronic warfare priority over frequency according to one aspect of the present disclosure.
Figure 3:
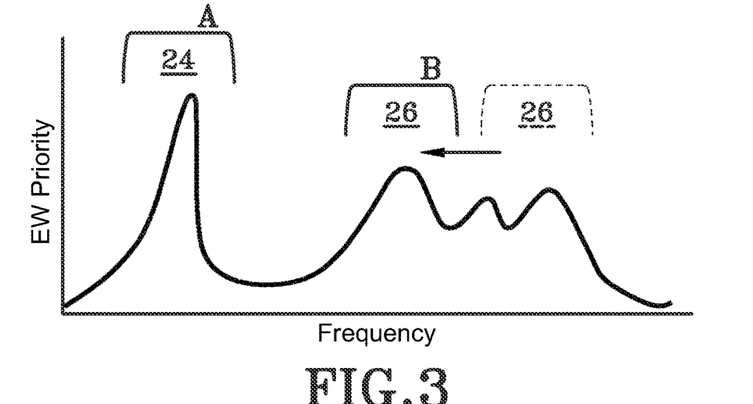
FIG. 3 (FIG. 3) is a second exemplary histogram of an electronic warfare priority over frequency according to one aspect of the present disclosure.
Figure 4:
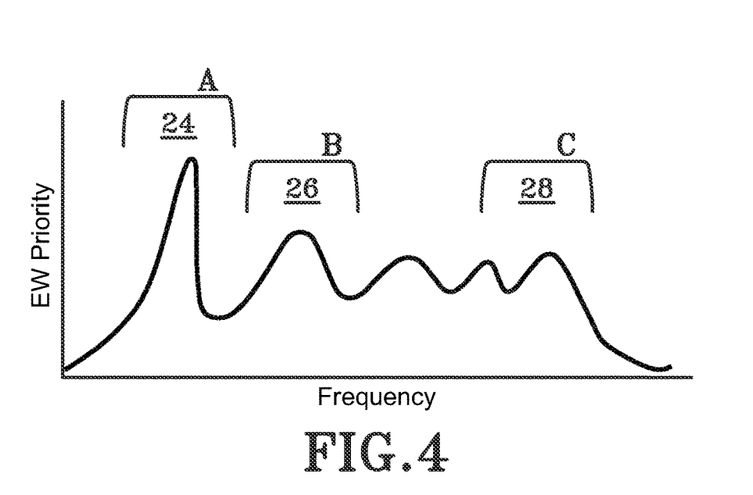
FIG. 4 (FIG. 4) is a third exemplary histogram of an electronic warfare priority over frequency according to one aspect of the present disclosure.

With reference to FIGS. 2-4, as mentioned above, EW system 10 creates a system-wide priority over frequency curve to allocate receiver 16 assets to the highest priority frequency range in near real-time. Accordingly, by way of the non-limiting examples illustrated in FIGS. 2-4, EW system 10 system-wide priority over frequency histograms are shown with the X axis thereof representing the operable frequency range of EW system 10 with the Y axis representing the EW priority of detected signals.

With reference to FIG. 2, EW system 10 may allocate receivers 16 to cover one or more specific frequency ranges (each referred to herein as a frequency channel, or simply channel, as represented by the brackets labeled A, B, and C in FIGS. 2-4). Accordingly, a first receiver 24 may be assigned to a first channel A, which may be the frequency range encompassing a detected signal having been assigned the highest priority while a second receiver 26 may be assigned to a second channel B covering a second frequency band encompassing a signal having the second highest priority. As shown in FIG. 2 with respect to second receiver 26, channel B may encompass more than one emitter signal falling within the same frequency band. In the example shown therein, channel B encompasses two emitters having nearly equal priority, represented by the two side-by-side peaks. A third, nearly equal priority emitter signal is show just outside of channel B to the left, representing a signal detected at a lower frequency outside of the band encompassed by channel B.

As illustrated by this example in FIG. 2, the presence of a signal that does not have a receiver assigned thereto shows the importance of adaptive asset allocation. If that emitter came online during a mission, but was not previous expected by a predetermined MDF and scan schedule, that emitter may evade detection, or the detection thereof may be delayed in current EW systems. If that emitter was an enemy unit that poses a threat to platform 20, the failure to detect, or delay in detection, may cause the platform to be damaged or lost.

With reference then to FIG. 3, in EW system 10 all frequency bands without a receiver 16 assigned thereto, such as the signal discussed above, continuously increase in priority in the cognitive scheduler such that each band will eventually reach a high enough priority that a receiver 16 asset is assigned thereto. This is seen in FIG. 3 in that receiver 24 may remain in channel A as the detected signal maintains its highest priority status; however, channel B may be assigned to a different frequency band encompassing the now higher priority signal therein, thus resulting in second receiver 26 being reallocated to the reassigned priority channel. In the meantime, all other frequency bands will continue to increase in priority, thus ensuring that all bands will eventually have a receiver 16 allocated thereto to properly reassess priority to ensure that no signals are missed or otherwise not evaluated.

In instances where a lower priority is determined by a receiver 16, as discussed above, the EW priority may be reduced or lowered to zero for that particular frequency band; however, EW system 10 provides that once the priority is reduced, it will again begin increasing in priority.

This ensures that EW system 10 does not ignore this band for the remainder of the operation, and will instead revisit this frequency band once the priority level increases and so dictates. This system of increasing priorities provides that frequency bands with lower priority signals are revisited less often than bands with higher priority signals, but simultaneously provides that these lower priority bands do get revisited over the course of operation.

With reference now to FIG. 4, first receiver 24 still remains allocated to channel A to continue to monitor the highest priority signal; however, as seen in the histogram in FIG. 4, a new priority signal has been detected and is shown having the second highest priority across the field of view. In this example, then second channel B is shifted and second receiver 26 may be allocated to that second highest priority signal. In this case, a third receiver 28 may be allocated to a third channel C encompassing the third highest priority signal to continue the monitoring and evaluation thereof. Similarly, if a detected emitter goes off-line, the priority thereof may be reduced and any receivers allocated to those channels may be reassigned. Again, it will be understood that the remaining channels without a receiver 16 assigned thereto will continue to increase in priority over time.

In congested environments, the ability of EW system 10 to reactively allocate receivers 16 may allow for more thorough detection and priority assessment of the crowded emitter environment as each frequency band in the desired field of view will be visited by receivers 16 while being simultaneously monitored by wideband receiver 14. This may reduce or eliminate the number of undetected, but otherwise active emitters, and may represent a more efficient use of EW system 10 assets by likewise eliminating the time spent monitoring or looking for expected emitters that are not present or active.

Figure 5A:
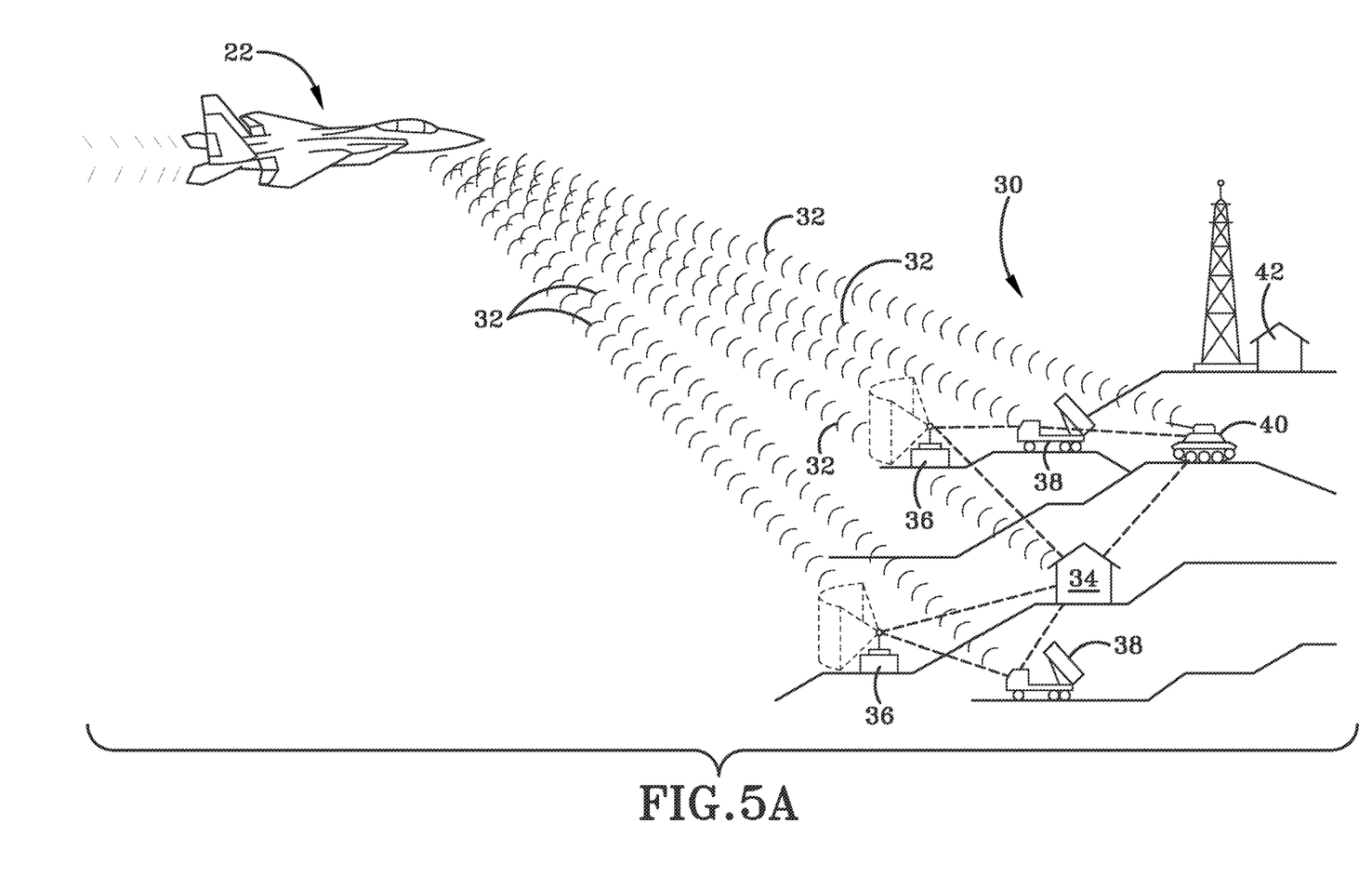
FIG. 5A (FIG. 5A) is an exemplary operational view of an aircraft carrying a cognitive electronic warfare system operating in a theater containing high electromagnetic spectrum utilization according to one aspect of the present disclosure.
Figure 5B:
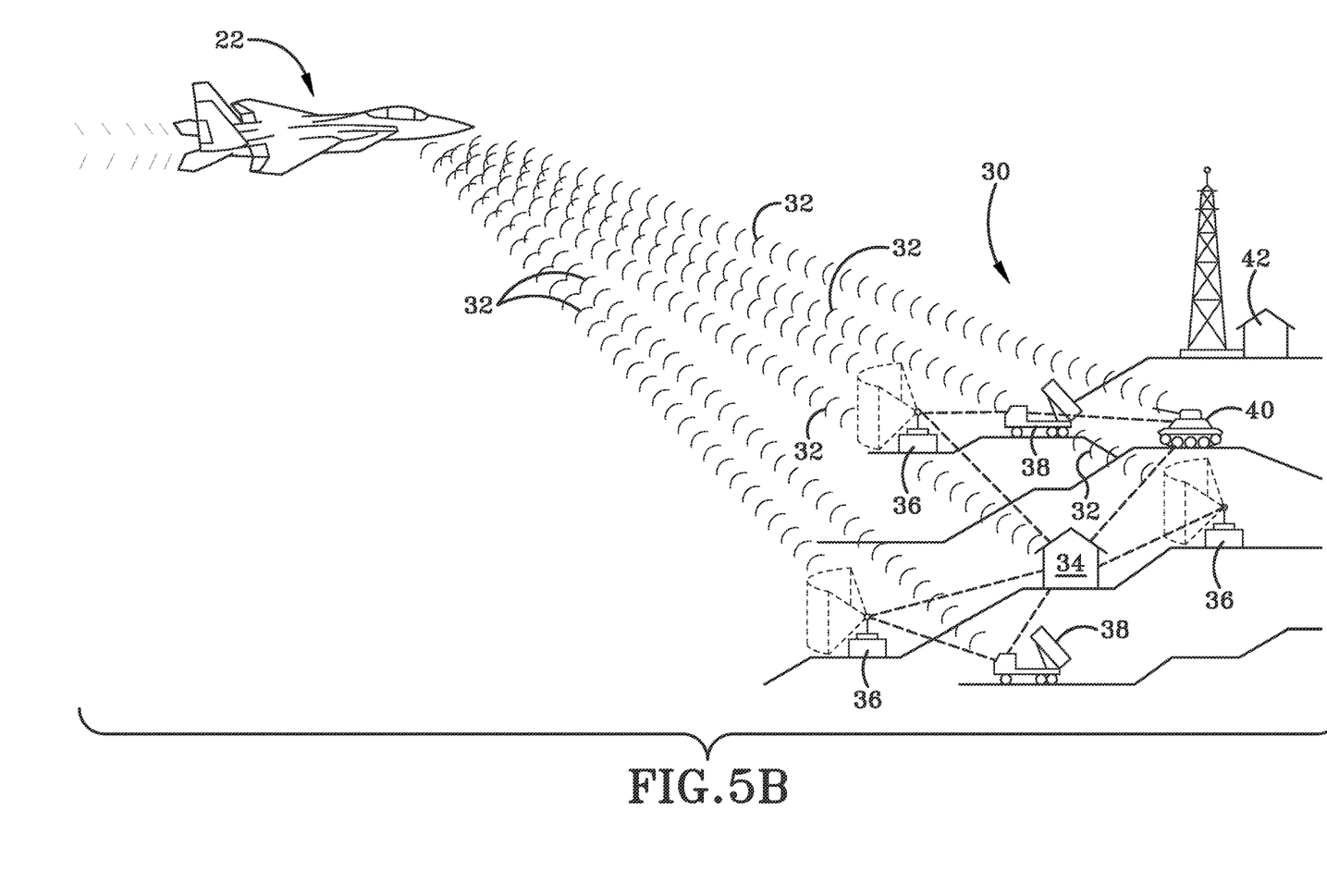
FIG. 5B (FIG. 5B) is a second exemplary operational view of an aircraft carrying a cognitive electronic warfare system operating in a theater containing high electromagnetic spectrum utilization according to one aspect of the present disclosure.

A real-life example of a process of operation for EW system 10 may be best illustrated by the depictions in FIGS. 5A and 5B. Specifically, FIGS. 5A and 5B represent an operational example wherein an aircraft 22 utilizing EW system 10 is operated within a theater 30 containing multiple RF emitters therein. According to the example shown, these emitters may be enemy installations and enemy units including search radar installations 36, anti-aircraft vehicles 38, including tracking radar capabilities, and other offensive vehicles such as tanks 40 (likewise including tracking radar capabilities). Theater 30 may further include a centralized command or communications station 34 and one or more civilian installations 42. For purposes of this example, civilian installation 42 may be a media station, such as a radio or television broadcast station, a weather station, or a similar installation. For purposes of this operational example, it is assumed that like emitters operate in the like frequency bands. Put another way, this example assumes radar installations 36 all operate within the same frequency band while anti-aircraft vehicles 38 likewise operate within the same frequency band, and so forth.

As aircraft 22 operates in theater 30, active RF signals 32 being generated and emitted from the various units, may be detected by wideband receiver 14 and receiver asset 16 may be allocated thereto. As these signals are detected, they are assigned a priority level and the highest priority levels will have receivers 16 allocated thereto first. In this example, enemy units that pose a threat to aircraft 22 would receive the highest priority. Accordingly, EW system 10 would allocate receivers 16 first to anti-aircraft units 38 and tanks 40 (and the tracking radars used thereby). Search radar 36 may be next as it may be able to locate and/or identify aircraft 22, but otherwise does not pose an offensive threat itself. Finally, communication station 34 and civilian installation 42 would be assigned the lowest priorities.

While aircraft 22 continues operating in theater 30, receiver 16 assets will be allocated more frequently to the signals generated by anti-aircraft units 38 and tanks 40 and may be reallocated to other signals such as search radar 36 and/or communications 34 as these signals increase in priority.

With reference now to FIG. 5B, utilizing the same example as previously discussed, FIG. 5B depicts a new emitter, namely, search radar installation 36 shown on the right side of theater 30 coming online. In this instance, wideband receiver 14 of EW system 10 would detect the RF signal coming online from the new radar installation 36 and may assign a priority and/or allocate a receiver 16 asset thereto to collect additional data therefrom. Thus, as the RF environment changes during aircraft 22's operation within theater 30, EW system 10 may adaptively allocate receiver assets.

Figure 6:
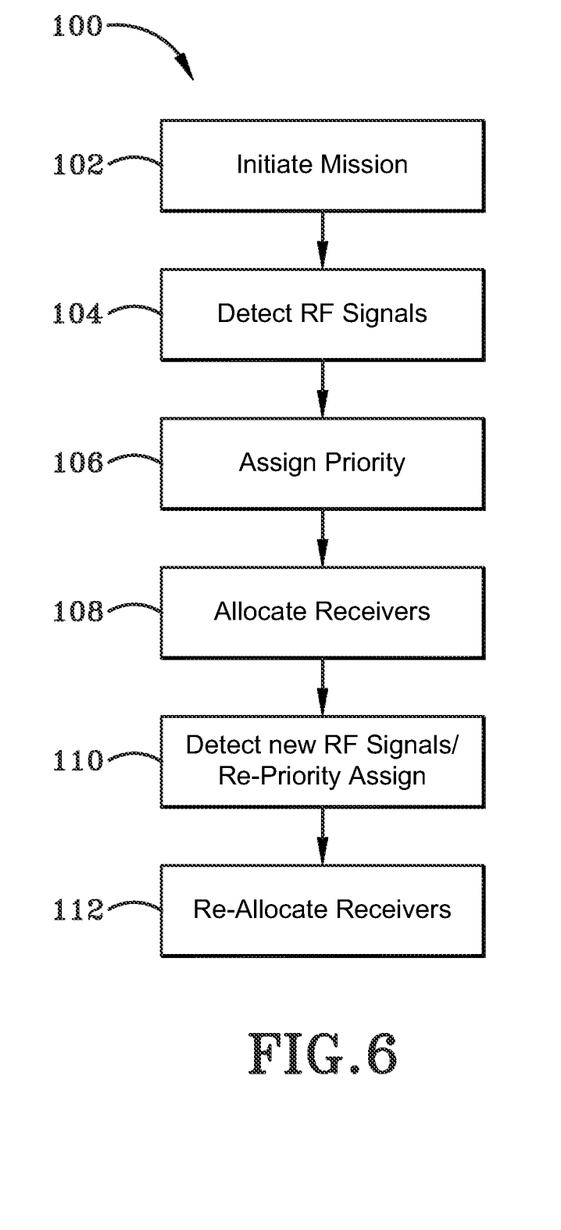
(FIG. 6) is an exemplary flow chart depicting an exemplary operation of a cognitive electronic warfare system according to one aspect of the present disclosure.

With reference now to FIG. 6, a general process of operation may be illustrated by way of exemplary flowchart and may be generally indicated as process 100. Process 100 may begin with the initiation of a mission into a theater 30 indicated as step 102. Once the platform 20 carrying EW system 10 enters a theater 30, process 100 may continue with the detection of RF signals within theater 30 by wideband receiver 14. The detection of signals is indicated as step 104.

Having detected signals, EW system 10 may assign priority thereto, again with one exemplary criteria being the level of threat posed to platform 20 therefrom. As the assignment of priority (indicated as step 106) is completed, EW system 10 may then allocate receiver 16 assets to the frequency bands encompassing the highest priority signals as indicated in step 108.

As platform 20 continues to operate within theater 30, EW system 10 may continuously detect new RF signals while simultaneously accounting for frequency bands that have not recently had a receiver 16 assigned thereto through the continuous increase in priority of such frequency bands, as discussed previously herein. This detection of new signals and/or increasing of priority of frequency bands without a receiver 16 assigned thereto is understood to occur on a continuous or near continuous basis during operation within theater 30 and is generally indicated as step 110. Then, in near real-time, EW system 10 may dynamically reallocate receiver 16 assets according to the detection of new signals and/or the increase to a higher priority of frequency bands from step 110. The reallocation of receivers is indicated as step 112 in process 100.

Each of these steps, particularly the continuous detection and reallocation of receivers 16 shown in steps 110 and 112, may occur repeatedly throughout the entirety of the operations within theater 30. Thus, EW system 10 may quickly, efficiently, and dynamically manage the receiver 16 assets to react to the RF environment in near real-time while continually optimizing receiver 16 allocations to align to the measured RF environment. EW system 10 may adjust extremely quickly and may provide increased optimization and increased RF frequency pulse detection while likewise benefitting from the elimination of the need for a predetermined scan schedule and/or MDF.

As discussed herein, EW system 10 may include a wideband receiver 14 for instantaneous or near instantaneous detection of signals emitted across the full spectrum field-of-view; however, EW system 10 may operate in similar ways without a wideband receiver 14 included therein through the use of the increasing priority of frequency bands without a receiver 16 assigned thereto. The benefits of eliminating wideband receiver 14 include the ability to better adapt EW system 10 for use with legacy systems that do not already include wideband receiver 14 as well as reduced cost and maintenance, as there are less assets requiring installation or upkeep. The tradeoff is that the first input into the cognitive scheduler algorithm may reduce or slow the real-time adjustments and allocations of receivers 16. Instead, the re-allocation of receivers 16 may be dictated by the increasing priority of frequency bands that do not have a receiver 16 assigned thereto, meaning the operational timing of receiver 16 allocation may be slightly increased. Despite this, the other benefits may remain in that EW system 10 without a wideband receiver 14 may dynamically react to the RF environment without the need to predetermine and generate an MDF and/or scan schedule.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:
   operating a platform carrying at least one wideband receiver and at least two additional receivers thereon in a theater containing one or more active emitters;
   detecting electromagnetic (EM) signals originating from the one or more active emitters with the at least one wideband receiver;
   assigning a priority level to each frequency band of a plurality of frequency bands encompassing the detected EM signals from the at least one or more active emitters;
   allocating a first receiver of the at least two additional receivers to a first frequency band having the highest priority level of the plurality of frequency bands, the first frequency band encompassing a first detected EM signal; and
   allocating a second receiver of the at least two additional receivers to a second frequency band having the second highest priority level of the plurality of frequency bands, the second frequency band encompassing a second detected EM signal.

2. The method of claim 1 further comprising:
   continuously increasing the priority level of each frequency band of the plurality of frequency bands that does not have a receiver of the at least two additional receivers allocated thereto.

3. The method of claim 2 further comprising:
   reallocating at least one of the at least two additional receivers to a third frequency band of the plurality of frequency bands when the third frequency band increases to a priority level higher than the priority level of one of the first and second frequency bands.

4. The method of claim 3 further comprising:
   continuously reallocating the at least two additional receivers to other frequency bands of the plurality of frequency bands as the priority levels increase over time.

5. The method of claim 1 wherein each step is performed continuously and in near real-time.

6. The method of claim 1 wherein detecting EM signals, assigning priority levels, and allocating the at least two additional receivers are performed without a predetermined scan schedule.

7. The method of claim 1 wherein assigning the priority level further comprises:
   determining a threat level of each active emitter in the theater; and
   assigning a relative priority to the plurality of frequency bands according to the threat level of the emitters generating EM signals in each band of the plurality of frequency bands.

8. The method of claim 1 further comprising:
   detecting an EM signal originating from a newly active emitter in the theater with the at least one wideband receiver;
   assigning a priority level to the frequency band of a plurality of frequency bands encompassing the EM signal from the newly active emitter; and
   reallocating one of the first and second receivers of the at least two additional receivers to a frequency band encompassing the EM signal from the newly active emitter only if the priority level thereof exceeds the priority level of one of the first and second frequency bands.

9. The method of claim 8 further comprising:
   continuously increasing the priority level of each frequency band of the plurality of frequency bands that does not have a receiver of the at least two additional receivers allocated thereto; and
   continuously reallocating the at least two additional receivers to other frequency bands of the plurality of frequency bands as the priority levels increase over time.

10. The method of claim 8 wherein assigning the priority level further comprises:
    determining a threat level of each active emitter in the theater; and
    assigning a relative priority to the plurality of frequency bands according to the threat level of the emitters generating EM signals in each band of the plurality of frequency bands.

11. The method of claim 1 wherein the platform is an aircraft.

12. A method comprising:
    operating a platform carrying a plurality of receivers thereon in a theater containing a plurality of active emitters;
    detecting an electromagnetic (EM) signal originating from the at least one active emitter with the at least one receiver;
    assigning a priority level to a first frequency band of a plurality of frequency bands encompassing the detected EM signal from the at least one active emitter;
    allocating the at least one receiver to the first frequency band;
    continuously increasing the priority level of each frequency band of the plurality of frequency bands that does not have a receiver of the at least one receiver allocated thereto;
    continuously reallocating the at least one receiver to other frequency bands of the plurality of frequency bands as the priority levels increase over time;
    detecting a first EM signal originating from a first emitter of the plurality of active emitters;
    detecting a second EM signal originating from a second emitter of the plurality of active emitters;

assigning a priority level to a first frequency band of the plurality of frequency bands encompassing the first EM signal and a second frequency band of the plurality of frequency bands encompassing the second EM signal;

allocating a first receiver of the plurality of receivers to the one of the first and second frequency bands having the higher priority level; and allocating a second receiver of the plurality of receivers to the other of the first and second frequency bands having the lower priority level.

13. The method of claim 12 further comprising:

detecting an EM signal originating from a newly active emitter in the theater;

assigning a priority level to the EM signal from the newly active emitter; and reallocating the at least one receiver to a second frequency band of the plurality of frequency bands encompassing the EM signal from the newly active emitter only if the priority level thereof exceeds the priority level of the first frequency band.

14. The method of claim 12 wherein detecting EM signals, assigning priority levels, and allocating the at least two additional receivers are performed without a predetermined scan schedule.

15. The method of claim 12 wherein assigning the priority level further comprises:

determining a threat level of each active emitter in the theater; and assigning a relative priority to the plurality of frequency bands according to the threat level of the emitters generating EM signals in each band of the plurality of frequency bands.

16. The method of claim 12 wherein each step is performed continuously and in near real-time.

17. The method of claim 12 wherein the platform is an aircraft.

* * * * *